C. LAAUWE & R. J. WYNKOOP.
Car-Brake.
No. 162,177.  Patented April 20, 1875.
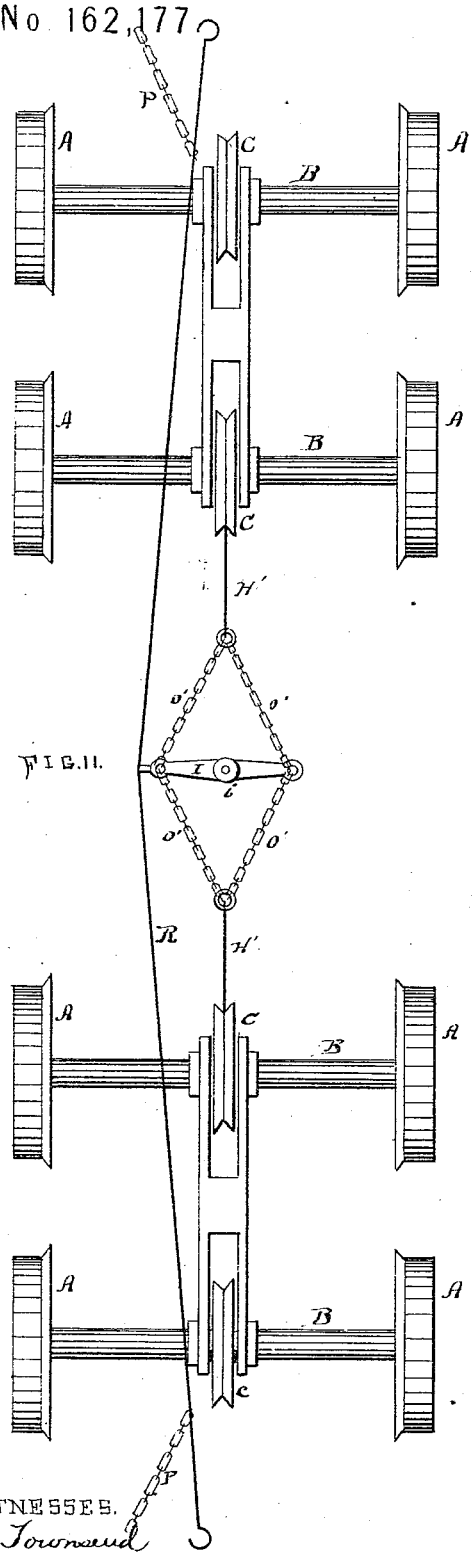
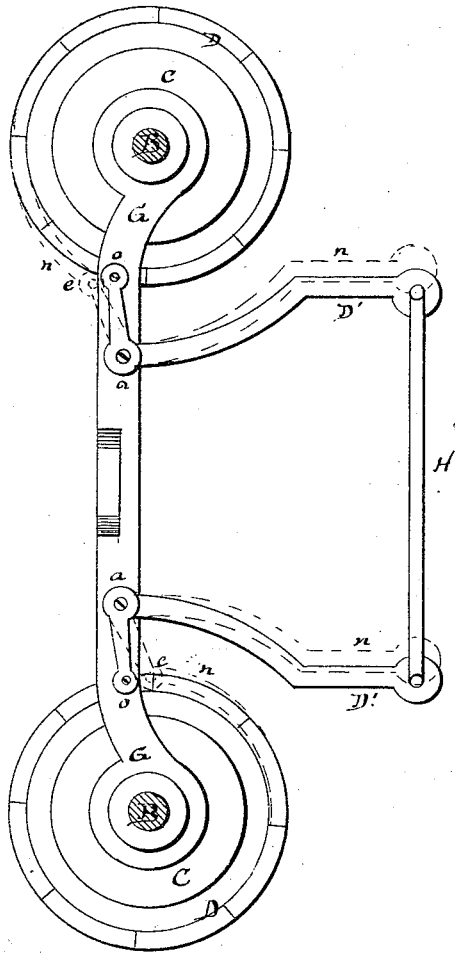
Witnesses:
F. B. Townsend
E. M. Gallaher
Inventors:
Cornelius Laauwe
Richard J. Wynkoop
By their atty
R. D. O. Smith

UNITED STATES PATENT OFFICE.

CORNELIUS LAAUWE AND RICHARD J. WYNKOOP, OF PATERSON, N. J.

IMPROVEMENT IN CAR-BRAKES.

Specification forming part of Letters Patent No. 162,177, dated April 20, 1875; application filed December 1, 1874.

*To all whom it may concern:*

Be it known that we, CORNELIUS LAAUWE and RICHARD J. WYNKOOP, both of the city of Paterson, in the county of Passaic and State of New Jersey, have invented new and useful Improvements in Railroad-Car Brakes; and we do hereby declare that the following is a full, clear, and exact description thereof, reference being had to the accompanying drawings, and to the letters of reference marked thereon, making a part of this specification.

The object of our invention is to provide a cheap, simple, and effective brake for cars, and at the same time connect them in such a manner that the whole of them may be operated from any part of the train so that the train may be brought to a stand-still as suddenly as safety to the train will permit.

The nature of this invention consists in the combination of independent brake-wheels being placed near the center or middle of the car-axles with operating-levers, and connecting with and running from one truck to the other, and constructing them in such a manner that the whole of the brakes are operated simultaneously from one end of the train to the other from any standpoint upon the train, and bring the same to a sudden stop.

To enable others skilled in the art to make and use our invention, we will proceed to describe its construction and operation.

Figure I represents a side elevation of the brake-wheels and levers belonging to one set of trucks, showing the brakes and levers connected with them. Fig. II is a top plan view of two trucks and the brake-wheels, on which the brakes are not shown; also the connections from one truck to the other.

Letters of like name and kind refer to like parts in each of the figures.

A represents the ordinary car-wheels, and B the axles to which they are secured. C C are the brake-wheels, made of lesser diameter than the traction-wheels, or the wheels that support and carry the body of the car. The brake-wheels are rigidly secured to the axles B, and, for the purpose of getting a greater bearing-surface for the brake, the periphery of these wheels is grooved out, as clearly shown in Fig. II—although the face or periphery of these wheels may be plain or flat without affecting materially our invention. D represents the brakes, made in any well-known manner, so as to fit around the brake-wheels C; but we find them to be most effective to groove out the face of the wheel, and make the brakes, blocks, or shoes in sections so as to fit the face of the wheels, and to rigidly secure the said sections to a spring-strap, or equivalent, so as to encircle the brake-wheel, which gives a greater amount of friction surface than can be obtained in any other way. D' D' represent elbow-levers, which have their fulcrums at $a$ $a$ in connecting-piece G. The lower ends of these levers D' D' connect with the spring-strap $e$ at $o$. At the top of the levers is a connecting-rod, H, which works loosely in the said levers, so as to allow them to operate, but compels them to act or move simultaneously with each other. I is a lever of suitable length fastened in its center at $i$ to the car upon the under side near the center. $o'$ $o'$ $o'$ $o'$ are chains secured to the outer ends of the lever or bar I. The other ends of these chains are secured to the connecting-rods H' H', that connect the brakes upon the front and rear trucks.

In Fig. I the brakes are shown as being brought hard down on the brake-wheels, and the dotted lines $n$ show the position of the brakes and levers when they are slackened and not operating as a brake to stop the cars or to reduce their speed.

The rod R and chains P are for connecting with the brakes attached to other cars.

We claim—

1. The brake-wheels C located upon the axle B, between the wheels A A, in combination with the brake-strap shoe D, lever D', and a connecting-rod, H', substantially for the purpose set forth.

2. The combination of the brake-wheels C C, one upon each axle B, and the brake-strap shoes D D, levers D' D', pivoted to the bar G, and connecting-rod H, to communicate movement from one to the other of said levers, as set forth.

CORNELIUS LAAUWE.
RICHARD J. WYNKOOP.

Witnesses:
C. ROGERS,
FRANK ROGERS.